(12) United States Patent
Roquemore, III

(10) Patent No.: US 8,317,085 B2
(45) Date of Patent: Nov. 27, 2012

(54) FRAUDULENT DOCUMENT DETECTION SYSTEM AND METHOD

(75) Inventor: John P. Roquemore, III, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 495 days.

(21) Appl. No.: 12/582,128

(22) Filed: Oct. 20, 2009

(65) Prior Publication Data

US 2010/0155463 A1    Jun. 24, 2010

Related U.S. Application Data

(60) Provisional application No. 61/139,818, filed on Dec. 22, 2008.

(51) Int. Cl.
*G06F 17/00* (2006.01)

(52) U.S. Cl. .......................... 235/375; 235/379; 235/494

(58) Field of Classification Search ................. 235/375, 235/379, 462.01, 494
See application file for complete search history.

(56) References Cited

U.S. PATENT DOCUMENTS

| | | | | |
|---|---|---|---|---|
| 6,068,301 A | * | 5/2000 | Han et al. | 283/82 |
| 6,141,438 A | * | 10/2000 | Blanchester | 382/140 |
| 2002/0017559 A1 | * | 2/2002 | Mos et al. | 235/380 |
| 2004/0035932 A1 | * | 2/2004 | Bailleu et al. | 235/454 |
| 2008/0129037 A1 | * | 6/2008 | Roth et al. | 283/85 |
| 2008/0149713 A1 | * | 6/2008 | Brundage | 235/435 |

* cited by examiner

*Primary Examiner* — Ahshik Kim
(74) *Attorney, Agent, or Firm* — Paul W. Martin

(57) ABSTRACT

A system for detecting fraudulent documents comprises a barcode reader and a sensor arrangement. The output from the barcode reader and the sensor arrangement are used in conjunction to increase the accuracy of determining if a document is fraudulent.

18 Claims, 1 Drawing Sheet

FRAUDULENT DOCUMENT DETECTION SYSTEM AND METHOD

CROSS-REFERENCE TO RELATED APPLICATIONS

The present application claims the benefit of the filing date of Provisional Application Ser. No. 61/139,818, filed Dec. 22, 2008, under the same title.

FIELD OF THE INVENTION

This invention relates to a system and method for detecting fraudulent documents. More particularly, but not exclusively, it relates to a method and system for detecting fraudulent documents comprising a barcode and further security features.

BACKGROUND TO THE INVENTION

A large number of documents, such as passports and airline tickets, now encode data in the form of a barcode. Further security features are often added to such documents in order to increase the security, such as watermarks, the owner's photograph and written details of the document's rightful owner.

Highly skilled forgers can produce documents that look exceptionally similar to genuine documents and which cannot be readily detected by security personnel who have only a limited amount of time in order to verify the authenticity of the information presented to them in a document.

SUMMARY OF THE INVENTION

According to a first aspect of the present invention there is provided a method of detecting a fraudulent document comprising the steps of:
i) reading content stored in a coded form on the document using a reader;
ii) determining a characteristic of further content of the document using a sensor arrangement; and
iii) verifying the characteristic of the further content at a processor.

Step (i) may comprise reading a barcode using a barcode reader. Step (i) may comprise reading coded data from an RFID tag, typically a near-field communications (NFC) tag, using an RFID tag reader. Step (iii) may comprise comparing the coded content to an entry in a reference database.

Step (ii) may comprise determining spacing between at least two defined fields printed on the document. Step (iii) may comprise comparing the spacing between said defined fields to a reference spacing. The likelihood of a forger replicating exactly the distance between fields within a document is small, the more inter-field distances that are measured the higher the likelihood of detecting a fraudulent document.

Step (ii) may comprise determining the content of text printed on the document. Step (ii) may comprise determining the content of said text using optical character recognition. The coded information and the text may be printed on opposite sides of the document. Step (iii) may comprise verifying that the content of the text matches at least part of the content of the coded information. In many instances of fraudulent documents the textual information does not match the coded information, typically in the form of a barcode, present on the document. Thus, a comparison of the content of the textual and coded information yields an indicator of whether a document is fraudulent or not.

Step (ii) may comprise determining the content of an image printed on the document. Step (iii) may comprise comparing the content of said image to a reference image. Step (iii) may comprise cross-referencing an entry in a database corresponding to the image to at least part of the coded information read in Step (i). The image may comprise a photograph, typically of the document owner. Similarly to textual content, an image imprinted on a fraudulent will often not correspond to the content of the coded information stored on the document.

Step (ii) may comprise capturing a plurality of images of the printed image, each captured image being captured when the document is illuminated by a different one of a plurality of light sources. Step (iii) may comprise comparing the content of said image to a reference image. At least two of the plurality of light sources may be aligned differently with respect to the document. At least two of the plurality of light sources may operate at different wavelengths. The image may comprise a watermark. The term watermark is used herein to encompass holographic as well as classical watermarking technology, such that the watermark may be embedded in a plastic laminate of the document or embedded in the print media forming the document. The illumination of certain types of image embedded in a document, in particular a watermark, from differing light sources will produce differing contrast and possibly colour variations within an image of the watermark. Variations the inclination of the light sources with respect to the document and/or wavelength of the light emitted by the light sources enhance these effects.

Step (ii) may comprise determining whether a projection is present on a surface of the document. Step (ii) may comprise illuminating the surface of a document at an acute angle with respect to a surface of the document, typically 30° or less. Step (ii) may comprise measuring the intensity of scattered light from the surface at a predefined angle with respect to the surface. Step (ii) may comprise measuring the intensity of laser speckle. Step (iii) may comprise comparing the intensity of said scattered light to a reference. The scattering of light from a surface of the document will be increased where a projection, typically formed by the insertion of a photograph under a plastic laminate, or the pasting on of a photograph, in the production of a fraudulent document, is present. The detection of the increased light scattering, compared to a reference flat surface, would indicate that a document is fraudulent.

According to a second aspect of the present invention there is provided a fraudulent document detection system comprising:
a reader device arranged to read content stored in a coded form on the document;
a sensor arrangement arranged to determine a characteristic of further content of the document; and
a processor arranged to receive the coded content and the further content and to verify the characteristic of the further content.

The reader device may comprise a barcode reader. The reader may comprise an RFID tag reader, typically a near-field communications (NFC) tag reader. The processor may be arranged to compare the coded content to an entry in a reference database in order to verify the coded content.

The sensor arrangement may be arranged to determine spacing between at least two defined fields printed on the document. The processor may be arranged to compare the spacing between said defined fields to a reference spacing.

The sensor arrangement may be arranged to determine the content of text printed on the document. The processor may be arranged to determine the content of said text using optical character recognition (OCR). The coded information and the text may be printed on opposite sides of the document. The processor may be arranged to verify that the content of the text matches at least part of the content of the coded information.

The sensor arrangement may be arranged to determine the content of an image printed on the document. The processor may be arranged to compare the content of said image to a reference image. The processor may be arranged to cross-reference an entry in a database corresponding to the image to at least part of the coded information. The image may comprise a photograph, typically of the document owner.

The sensor arrangement may be arranged to capture a plurality of images of the printed image, each captured image being captured when the document is illuminated by a different one of a plurality of light sources. The processor may be arranged to compare the content of said image to a reference image. At least two of the plurality of light sources may be aligned differently with respect to the document. At least two of the plurality of light sources may operate at different wavelengths. The image may comprise a watermark.

The sensor arrangement may be arranged to determine whether a projection is present on a surface of the document. A light source may be arranged to illuminate the surface of a document at an acute angle with respect to a surface of the document, typically 30° or less. The sensor arrangement may be arranged to measure the intensity of scattered light from the surface at a predefined angle with respect to the surface. The sensor arrangement may be arranged to measure the intensity of laser speckle. The processor may be arranged to compare the intensity of said scattered light to a reference.

The sensor arrangement may comprise a plurality of sensors, each of which is arranged to determine a different characteristic of the document. Non-limiting examples of sensors include: photosensors, camera, laser speckle detectors.

DETAILED DESCRIPTION OF PREFERRED EMBODIMENTS

Figure 1:
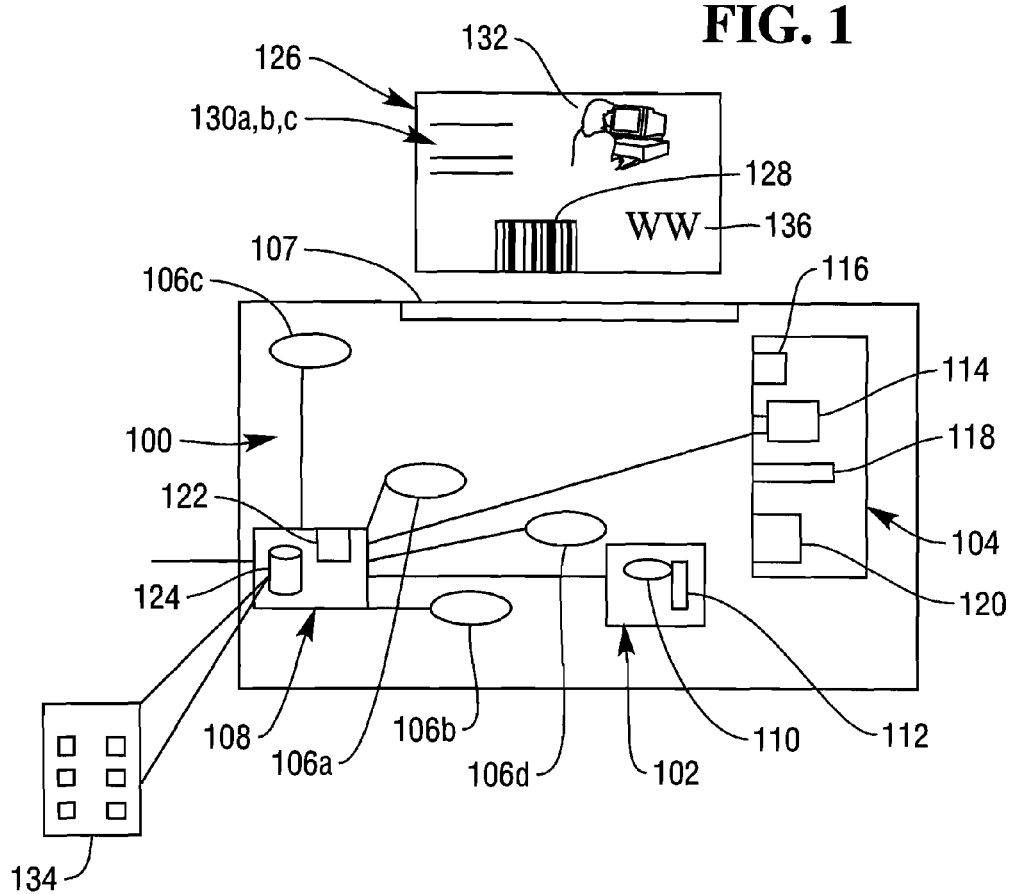
FIG. 1 is a schematic representation of a first embodiment of a fraudulent document detection system according to an aspect of the present invention.

Referring now to FIG. 1, a first embodiment of a fraudulent document detection system 100 comprises a barcode reader 102, a sensor arrangement 104, light sources 106a-d, a transparent platen 107 and a processing unit 108.

The barcode reader 102 comprises a light source 110 and a light sensitive array 112. In some embodiments the light source 110 is a laser light source, typically a laser diode light source and the array 112 is a linear or two dimensional array. In at least one alternative embodiment, the light source 110 is a polychromatic light source and the array 112 is camera, typically a charge coupled device (CCD) or CMOS array, arranged to capture an image of a barcode passing before the reader 102. A signal indicative of information contained within a scanned barcode is output from the array 112 to the processing unit 108.

The sensor arrangement 104 comprises a number of sensors 114, 116, 118, 120. Typically the sensors 114, 116, 118, 120 comprise a camera 114, a scatter photo-sensor 116 and a linear contrast sensor 118 and an OCR reader 120. Typically, the camera 114 is a CCD or CMOS array.

Three of light sources 106a-c are inclined at different angles with respect to the platen 107, with the light source 106c being inclined at a grazing angle, typically less than 30°, often 20° or less with respect to the platen 107. In some embodiments the light source 106c may be a laser light source and the scatter photo-sensor 116 may be a laser speckle detector. The fourth light source 106d emits light at a different wavelength to the other light sources 106a-c.

The processing unit 108 comprises a processor 122, and a data storage device 124, typically a magnetic hard disc.

In use, a document 126, such as a passport or driving license, bearing a barcode 128 is placed on the platen 107, typically the platen 107 has a raised edge such that the document 126 locates positively in a defined orientation on the platen 107. The barcode reader 102 reads the barcode 128 from the document 126 and passes data corresponding to the barcode 128 to the processor 122 which decodes the barcode 128. In some instances the barcode 128 is a PDF 417 barcode, which may be encrypted.

The scatter photo-sensor 116 is aimed at a target are of the platen 107 where a feature of the document 126 to be scanned that is known to be tampered with is found, for example a photograph on a driver's license or a passport. The light source 106c is activated by the processor 122 and the scatter photo-sensor 116 measures the level of light scattered from the target area. A signal corresponding to the scattered light level passes from the photo-sensor 116 to the processor 122 where it is compared to a signal threshold. If the level of light scattered from the target area exceeds the threshold the processor 122 flags the document as being possibly fraudulent.

The linear contrast sensor 118 is located such that it runs along a line where defined fields 130a,b,c printed in the document 126 to be scanned are located. Non-limiting examples of such fields are name, age, address etc. Any one, or combination of the light sources 106a-d are activated by the processor 122. The contrast sensor 118 senses where light is reflected from the document 126 and where it adsorbed, i.e. where there is ink printed on the document and where there is not. A signal corresponding to the distances between printed areas of the document is output to the processor 122. The processor 122 compares the signal output from the contrast sensor 118 to a reference signal and if the two do not match the processor 122 flags the document 126 as being possibly fraudulent.

The camera 114 is arranged to capture an image of either the whole of the document 126 or pre-defined areas of the document 126. In one mode, the camera 114 is aimed at a target area of the platen 107 where an image 132, typically a photograph of the document's bearer, is printed or attached to the document 126. The processor 122 instructs the camera 114 to capture the image 132. Data corresponding to the image 132 passes from the camera 114 to the processor 122. In some instances the processor 122 accesses a database 134 of images stored on the data storage device 124 and compares the data of the image 132 to an entry in the database 134, the database entry having been identified from the scanning of the barcode 128. If the data of the image 132 does not correspond to that of the database entry the processor 122 flags the document 126 as being possibly fraudulent.

In an alternative embodiment, processor 122 connects to a remote database and verifies the image data against and entry in the remote database as described hereinbefore.

The camera 114 can also be used to check for, and authenticate, watermarks 136 in the document 126. The processor 122 instructs each of the light sources 106a-d to illuminate the platen 107, and consequently the document 126, sequentially. The camera 114 captures a series of images of the document 126 synchronously with the illumination of the document 126 by the light sources 106a-d. The illumination of the watermark 136 within the document 126 by the light sources 106a-c at differing angles of incidence produces differing contrast and possibly colour variations between the series of the image of the watermark 136. The use of a different wavelength of the light emitted by the fourth light sources 106d produces a further difference in the colour refracted from holographic watermarks embedded in laminations and will enhance contrast effects associated with watermarks embedded in the printed media of the document 126. The camera 114 passes the series of images to the processor 122 where the images are compared to reference images in a manner substantially as described hereinbefore with reference to the document bearer's photograph. The processor 122 can be arranged to flag the document 126 as fraudulent if an expected reflection from a watermark is not viewed in a single image in a series, if contrast levels associated with a watermark are not correct between images in a series, or if refracted colour patterns are not correct in a single image, or between images in a series.

In some embodiments the camera 114 can be arranged to operate as the OCR sensor 120. However, the invention will be described with reference to the OCR sensor 120 being a discrete unit. The OCR sensor 120 captures an image of the document 126 through the platen 107 and passes the image to the processor 122. The processor 122 parses the data into text strings. The processor 122 establishes fields, such as name, address date of birth etc., and their contents from a template stored at the data storage device 124. Once established the contents of the fields are cross-referenced with the data extracted from the barcode 128 by the processor 122. If the data extracted from the fields by OCR do not correspond to those extracted from the barcode 128 the processor 122 flags the document 126 as potentially fraudulent. It will be appreciated that only a single field need be used to establish that a document is potentially fraudulent.

The processor 122 issues a warning to a user of the system that the document 126 appears fraudulent upon a pre-determined threshold criteria being met. The threshold criteria can be that any one, or combination of the conditions detailed above that indicate a possibly fraudulent document are reached. For sensitive issues such as border security controls, access to restricted area or firearms purchases only a single condition may have to be met. The processor 122 issues the warning to the user via a screen, not shown, an audio signal such as a beep or message, or via an alert issued to an electronic device of the user, such as a pager, mobile telephone or personal digital assistance. Alternatively, or additionally, the meeting of the pre-determined threshold criteria in an access control scenario can result in a door or entry port not being opened, or an area locked down.

It will be appreciated that although shown with a sensor arrangement comprising a plurality of sensor the present invention is operable with any one or combination of the sensors detailed hereinbefore operating as the sensor arrangement.

It will be appreciated that although shown with a document in which the barcode and other features are on a single side of the document they may be on opposite sides of the document, or some features may be on one side and some features may be on the other side of the document. In this instance the barcode reader and sensors are mounted appropriately to read their respective features.

In an alternative embodiment, not shown, a RFID tag reader replaces the barcode reader and the document has an RFID tag embedded in, or mounted upon, it, which holds data corresponding to that encoded in the barcode of the present embodiment.

Figure 2:
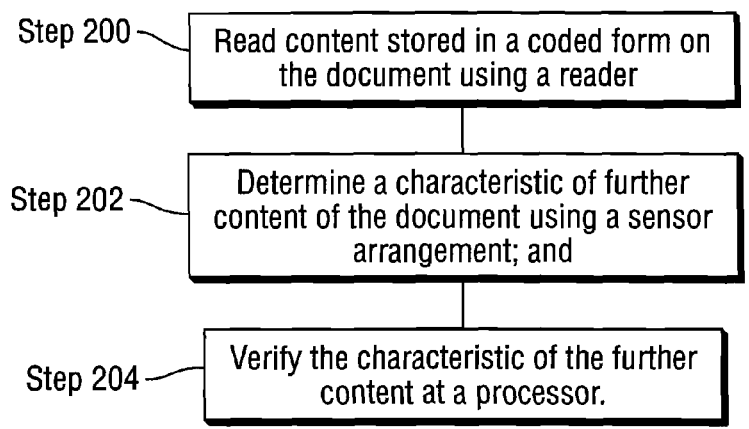
FIG. 2 is a flowchart detailing the steps of a method of detecting a fraudulent document.

Referring now to FIG. 2, a method of detecting a fraudulent document comprises reading coded content from a document using a reader, typically either a barcode reader or an RFID tag reader (Step 200). A sensor, or number of sensors determine at least one additional characteristic of further content of the document (Step 202). A processor verifies both the coded and the further content as either valid or not, possibly by cross-referencing them (Step 204).

It will be appreciated that although described with reference to a barcode scanner the present invention is applicable to any suitable self-service terminal (SST) or network of SSTs where document authentication may be applied. Examples of suitable SSTs include, but are not limited to, an automated teller machine (ATM), an information kiosk, an electronic funds transfer (EFT) terminal a financial services centre, a bill payment kiosk, a lottery kiosk, a postal services machine, a check-in and/or check-out terminal such as those used in the retail, hotel, car rental, gaming, healthcare, and airline industries, or the like.

As described herein the SST comprises one or more modules each of which is operable to perform at least one specific function. Typically, the module implements its function either in response to a customer action and/or a command received from a PC core (which is also a module) of the SST. Non-limiting examples of modules include: display, journal printer, operator panel, encrypting keypad, PC core, etc.

Typically, each module comprises a processor to enable the module to perform its function, and a communications facility to enable the module to communicate with the controller, but in some instances this may not be essential.

Each module comprises one or more devices that contributes to the execution of the module's respective function. Typically, each device comprises a replaceable part within the module. Non-limiting examples of devices include: for the display module, a display panel, a display panel housing, and the like.

Each device comprises one or more components configured to enable the device to contribute to the execution of the module's function.

It will also be appreciated that the steps of the methods described herein may be carried out in order suitable to effect the present invention, or simultaneously where appropriate. The methods described herein may be performed by software in machine readable form on a tangible storage medium or as a propagating signal.

Various modifications may be made to the above described embodiment without departing from the spirit and the scope of the invention.

The invention claimed is:

1. A method of detecting a fraudulent document comprising the steps of:
   i) reading content stored in a coded form on the document using a reader;
   ii) determining a characteristic of further content of the document using a sensor arrangement, including capturing a plurality of images of a printed image, each captured image being captured when the document is illuminated by a different one of a plurality of light sources, wherein at least two of the plurality of light sources are aligned differently with respect to the document; and
   iii) verifying the characteristic of the further content at a processor, including comparing the content of said image to a reference image.

2. The method of claim 1, wherein step (i) comprises reading a barcode using a barcode reader.

3. The method of claim 1, wherein step (ii) comprises determining spacing between at least two defined fields printed on the document and step (iii) comprises comparing the spacing between said defined fields to a reference spacing.

4. The method of claim 1, wherein step (ii) comprises determining the content of text printed on the document and step (ii) comprises determining the content of said text using optical character recognition.

5. The method of claim 4, wherein step (iii) comprises verifying that the content of the text matches at least part of the content of the coded information.

6. The method of claim 1, wherein step (ii) comprises determining the content of an image printed on the document and step (iii) comprises comparing the content of said image to a reference image.

7. The method of claim 6, wherein step (iii) comprises cross-referencing an entry in a database corresponding to the image to at least part of the coded information read in step (i).

8. The method of claim 1, wherein the printed image comprises a watermark.

9. The method of claim 1, wherein step (ii) comprises illuminating the surface of a document at an acute angle with respect to a surface of the document and measuring the intensity of scattered light from the surface at a predefined angle with respect to the surface and step (iii) comprises comparing the intensity of said scattered light to a reference.

10. A fraudulent document detection system comprising:
a reader device arranged to read content stored in a coded form on the document;
a sensor arrangement arranged to determine a characteristic of further content of the document, wherein the sensor arrangement is arranged to capture a plurality of images of the printed image, each captured image being captured when the document is illuminated by a different one of a plurality of light sources, wherein at least two of the plurality of light sources are aligned differently with respect to the document; and
a processor arranged to receive the coded content and the further content and to compare the content of said image to a reference image to verify the coded content and the characteristic of the further content.

11. The system of claim 10, wherein the reader device comprises a barcode reader.

12. The system of claim 10, wherein the sensor arrangement is arranged to determine spacing between at least two defined fields printed on the document and the processor is arranged to compare the spacing between said defined fields to a reference spacing.

13. The system of claim 10, wherein, the sensor arrangement is arranged to determine the content of text printed on the document and the processor is arranged to determine the content of said text using optical character recognition (OCR) and the processor is arranged to verify that the content of the text matches at least part of the content of the coded information.

14. The system of claim 13, wherein the coded information and the text are printed on opposite sides of the document.

15. The system of claim 10, wherein the sensor arrangement is arranged to determine the content of an image printed on the document and the processor is arranged to compare the content of said image to a reference image.

16. The system of claim 15, wherein the processor is arranged to cross-reference an entry in a database corresponding to the image to at least part of the coded information.

17. The system of claim 10, wherein the image comprises a watermark.

18. The system of claim 10, wherein a light source is arranged to illuminate the surface of a document at an acute angle with respect to a surface of the document and the sensor arrangement may be arranged to measure the intensity of scattered light from the surface at a predefined angle with respect to the surface and the processor is arranged to compare the intensity of said scattered light to a reference.

* * * * *